(12) United States Patent
Kanemitsu (10) Patent No.: US 6,714,732 B2
(45) Date of Patent: Mar. 30, 2004

(54) PHASE DIFFERENCE DETECTION METHOD, PHASE DIFFERENCE DETECTION APPARATUS, RANGE FINDING APPARATUS AND IMAGING APPARATUS

(75) Inventor: Shiroshi Kanemitsu, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 10/396,272

(22) Filed: Mar. 25, 2003

(65) Prior Publication Data

US 2004/0008983 A1 Jan. 15, 2004

(30) Foreign Application Priority Data

Mar. 26, 2002 (JP) ......................................... 2002-085503

(51) Int. Cl.$^7$ .............................. G03B 13/36; G01C 3/08
(52) U.S. Cl. ........................ 396/104; 396/128; 356/3.14
(58) Field of Search ................................. 396/104, 125, 396/128; 250/201.2, 201.6, 201.7, 201.8; 356/3.13–3.16, 4.04

(56) References Cited

U.S. PATENT DOCUMENTS

| | | | | |
|---|---|---|---|---|
| 5,212,515 A | * | 5/1993 | Ogasawara | ................. 396/104 |
| 6,108,435 A | * | 8/2000 | Mori et al. | ................. 382/106 |
| 6,332,061 B1 | * | 12/2001 | Arita | ......................... 396/104 |
| 6,442,344 B1 | * | 8/2002 | Nonaka | ..................... 396/104 |
| 2003/0164935 A1 | * | 9/2003 | Kanemitsu | ................. 356/3.14 |

* cited by examiner

*Primary Examiner*—W. B. Perkey
(74) *Attorney, Agent, or Firm*—Adams & Wilks (57) ABSTRACT

A phase difference detection apparatus for detecting a phase difference between images formed on a pair of optical sensor arrays in which the calculation of a compensation value is simplified. When a compensation effectiveness judgment unit judges that compensation of the pair of image data rows would be effective, a left and right difference compensation unit calculates a compensation amount based on a difference in maximum values and minimum values in a pair of image data rows corresponding to the images produced by the optical sensor arrays and compensates the image data rows by the calculated compensation amount. Based upon the compensated values, a correlation calculation unit carries out a correlation calculation, and a maximum correlation detection unit detects a maximum correlation level. Based upon the maximum correlation level, a interpolation calculation unit carries out an interpolation calculation, and a phase difference is detected by a phase difference detection unit.

14 Claims, 8 Drawing Sheets

PHASE DIFFERENCE DETECTION METHOD, PHASE DIFFERENCE DETECTION APPARATUS, RANGE FINDING APPARATUS AND IMAGING APPARATUS

BACKGROUND OF THE INVENTION

1. Field of the Invention

The present invention relates to a phase difference detection method, a phase difference detection apparatus, a range finding apparatus and an imaging apparatus.

2. Description of the Related Art

In a conventional automatic focusing camera and the like, when focusing on an object to be photographed by use of a so-called passive system, in the case of a non-TTL camera, the distance to the object is detected by use of an image of the object which does not pass through a taking lens. Thereafter, a position of the taking lens is controlled in response to the detected distance to the object. In the case of a TTL camera, a shift amount from a focused state is detected by use of an image of the object obtained through the taking lens. Thereafter, the rotational position of the taking lens is controlled in response to the detected shift amount. The principle of the above-described series of operations will be described below with reference to FIG. 7A.

Figures 7A, 7B:
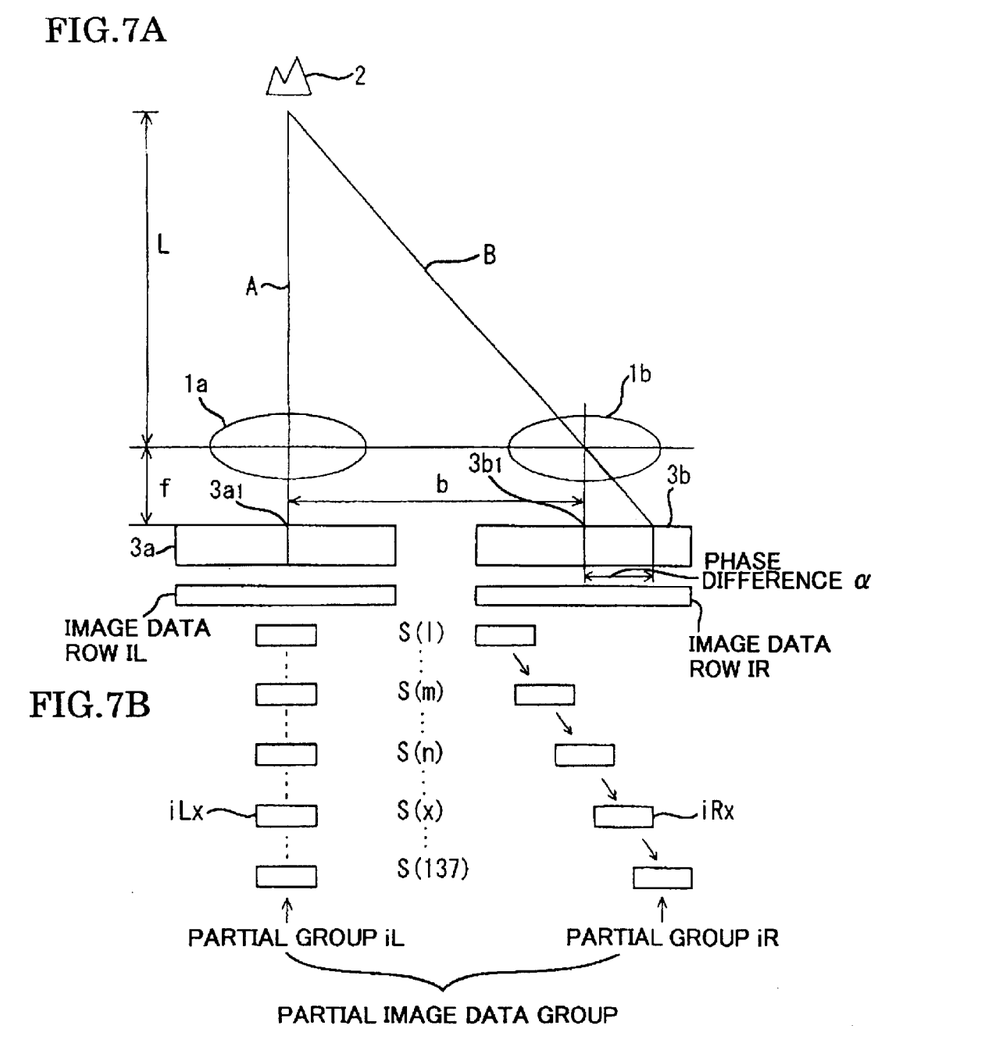
FIGS. 7A and 7B are explanatory views used for an operational explanation.

As shown, a pair of lenses $1a$ and $1b$ are disposed apart from each other by a predetermined base line length b, and images of an object 2 are respectively formed through optical paths A and B which are different from each other on a pair of optical sensor arrays $3a$ and $3b$ which are disposed apart from the pair of lenses $1a$ and $1b$ by a focal distance f. It is assumed that the object 2 is located at a position in front of the pair of lenses 1a and $1b$ by a distance L.

When the object 2 is located at a distance L of infinity, centers of the images formed on the pair of optical sensor arrays $3a$ and $3b$ are formed at reference positions ($3a1$, $3b1$) on the optical sensor arrays $3a$ and $3b$ which correspond to optical axes of the lenses $1a$ and $1b$. However, when the object 2 is closer than a distance of infinity, the images are formed at positions which are shifted by an amount $\alpha$ from the reference positions ($3a1$, $3b1$). Based on the principle of triangular ranging, the distance L to the object 2 equals $bf/\alpha$. Here, since the base line length b and the focal distance f are constants, if the shift amount $\alpha$ is detected, the distance L can be calculated. This is the principle of passive ranging (so-called outside light triangular ranging), which is used in the non-TTL camera. In the non-TTL camera the shift amount $\alpha$ may be used as it is for calculation purposes instead of using the distance L as an output value of a range finding apparatus.

In the case of the TTL camera, by applying a light passed through an imaging lens (not shown) to the pair of lenses $1a$ and $1b$ in the same manner as described above, the shift amount $\alpha$ between a pair of left and right images is detected. In this case, it is assumed that centers of images in case of a focused state are reference positions on the respective optical sensor arrays $3a$ and $3b$. Thus, positive and negative values of the shift amount $\alpha$ indicate a front focus state and a rear focus state, respectively, and the absolute values thereof indicate an extent of the shift from in-focus. In the present specification, the shift amount $\alpha$ is referred to as a phase difference.

In any of the cameras described above, the image of an object to be photographed is formed on the pair of optical sensor arrays by an optical system, and a relative shift of the pair of image signals output by the pair of optical sensor arrays, i.e., the phase difference, is detected by carrying out a process known as correlation calculation about partial image data groups (see FIG. 7B) extracted from the pair of image signals, respectively. In addition, the phase difference detection described above is not limited to automatic focusing cameras but can be used for various range finding apparatuses, focal point detection apparatuses, and the like, which measure the distance to an object or focus on an object.

In an apparatus which uses phase difference detection as a method for reducing degradation of detection accuracy due to the presence of a back-light from strong light sources such as the sun, which serve as a background of an object to be photographed (at a time of so-called back-light), there is one such device which is described, for example, in Japanese Patent No. 3,230,759 (JP-A-5-264892). More specifically, it is judged whether or not there is an effect of a flare light acting as a back-light on the output of an optical sensor. When it is judged that there is an effect of a flare light, a compensation value based upon a difference in light intensities of the pair of the image signals and, more particularly, based on a difference in average values of respective image signals, is calculated. The calculated compensation value is added to or subtracted from one of the image signals. The phase difference is then calculated by carrying out the correlation calculation based upon the image signal after performing such compensation.

However, in the case of the technology described in the above Japanese Patent No. 3,230,759 (JP-A-5-264892), there was a necessity for performing complicated calculations for calculating the difference in the average values of respective image signals has in order to calculate the compensation value.

Figure 8:
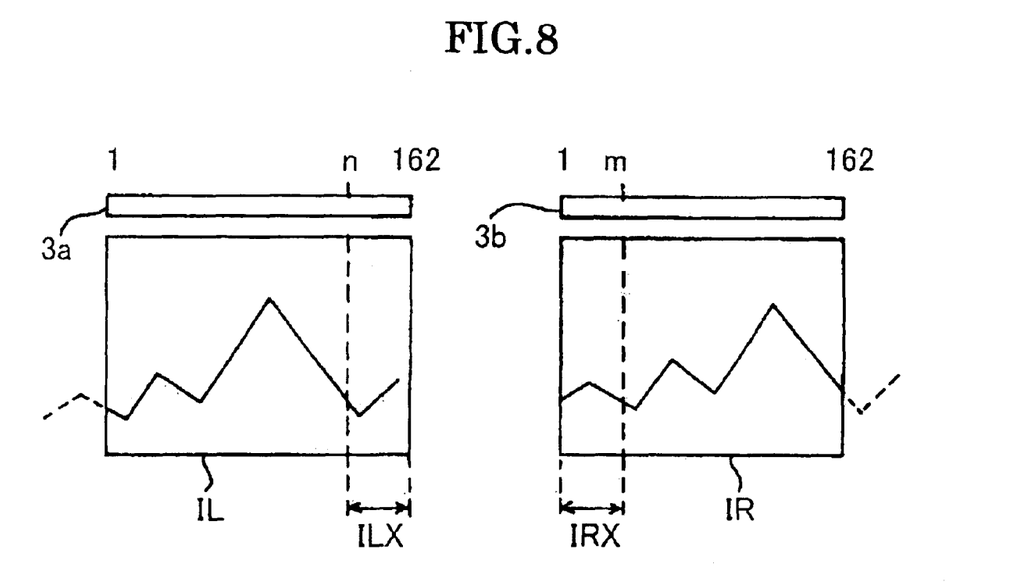
FIG. 8 is an explanatory view showing a pair of image data rows.

Also, in the above-described reference, since the compensation value is calculated only from the difference in average values of respective image signals, there was a possibility that a compensation of high accuracy could not be carried out. For example, as shown in FIG. 8, in the case of an image signal ILX which exists in an image signal IL and which does not exist in an image signal IR, and an image signal IRX which exists in the image signal IR and which does not exist in the image signal IL, even if the compensation value is calculated only based on the difference in average values of the pair of image signals including these image signals ILX and IRX, since the compensation value is affected by the image signals ILX and IRX which are different signals, high accuracy compensation can not be obtained. In FIG. 8, like reference numerals are applied to the like components as in FIG. 7.

SUMMARY OF THE INVENTION

An object of the present invention is to provide a phase difference detection method, a phase difference detection apparatus, a ranging (or range finding) apparatus, and an imaging apparatus in which it is possible to avoid complicated calculations in calculating the difference in the average values of the respective image signals needed in order to calculate the compensation value for reducing degradation of detection accuracy due to the presence of a strong light source such as the sun or the like which exists in the background or the like of an object to be observed.

Another object of the present invention is to provide a phase difference detection method, a phase difference detection apparatus, a range finding apparatus, and an imaging apparatus in which it is possible to reduce the effect of an image signal which exists in only one of the pair of image signals on the compensation value used in image signal compensation for reducing degradation of detection accuracy due to the presence of a strong light source such as the sun or the like which exists in the background or the like of the object.

A phase difference detection method according to a first aspect of the present invention comprises a compensation step of compensating for a difference in a pair of image data rows which are comprised of a plurality of image data values generated in response to outputs of a pair of optical sensor arrays on which images of an object are formed, based upon a difference in maximum image data values in each of the pair of image data rows and a difference in minimum image data values in each of the pair of image data rows, and a detection step of detecting a phase difference between the images formed on the pair of optical sensor arrays based upon the pair of image data rows after performing the compensation.

By the foregoing method, since compensation of the pair of image data rows is carried out based upon the difference in maximum image data values in each of the pair of image data rows and the difference in minimum image data values in each of the pair of image data rows, it is possible to effectively avoid performing complicated calculations associated with calculation of the difference in average values of respective image signals in order to calculate the compensation value for reducing degradation of detection accuracy due to the presence of a strong light source such as the sun or the like which exists in the background or the like of the object, and it is possible to simplify the processes for compensation processing.

In accordance with a second aspect of the invention, the compensation step comprises the step of compensating for a difference in the pair of image data rows based upon the difference in the maximum image data values and the difference in the minimum image data values and an average value of image data in each of the image data rows. According to such method, since the compensation value is calculated based upon the difference in maximum image data in each of the pair of image data rows and the difference in the minimum image data in each of the pair of image data rows as well as the average values of the respective image signals, it becomes possible to reduce the effect caused by an image signal which exists in only one of the pair of image signals on the compensation value which occurs in case that the compensation value was calculated only from the average value of the respective image signals. Stated otherwise, in accordance with the second aspect of the invention, the compensation value of the first aspect of the invention is compensated based upon the average value of the respective image signals, so that high accuracy compensation becomes possible.

In accordance with a third aspect of the invention, a phase difference detection apparatus is provided which comprises a pair of optical sensor arrays on which images of an object are formed, a compensation unit for compensating for a difference in a pair of image data rows which are comprised of a plurality of image data values generated in response to outputs of the pair of optical sensor arrays, the compensation being performed based upon a difference in maximum image data values in each of the pair of image data rows and a difference in minimum image data values in each of the pair of image data rows, and a phase difference detection unit for detecting a phase difference between the images formed on the pair of optical sensor arrays based upon the pair of image data rows after the compensation is performed by the compensation unit.

By the foregoing structure, since the difference of the pair of image data rows is compensated based upon the difference of maximum image data in each of the pair of image data rows and the difference of the minimum image data in each of the pair of image data rows, it is possible to effectively reduce the complicated calculation for calculating the difference of average values of respective image signals in order to calculate the compensation value for reducing degradation of detection accuracy due to the presence of a strong light source such as the sun or the like which exists in the background of the object, or the like, and it is possible to simplify the processes for compensation processing.

In accordance with a fourth aspect of the invention, the compensation unit compensates for a difference in the pair of image data rows based upon the difference in the maximum image data values and the difference in the minimum image data values and an average value of image data in each of the image data rows. According to such structure, since the compensation value is calculated based upon the difference in the maximum image data values in each of the pair of image data rows and the difference in the minimum image data values in each of the pair of image data rows as well as the average values of the respective image signals, it becomes possible to reduce the effect on the compensation value of an image signal which exists in only one of the pair of image signals, which effect occurs when the compensation value is calculated based only on the average value of the respective image signals. Stated otherwise, in accordance with the fourth aspect of the present invention, the compensation value obtained in the third aspect of the invention is compensated based upon the average value of the respective image signals, so that high accuracy compensation becomes possible.

In accordance with a fifth aspect of the invention, a range finding apparatus is provided with the above-described phase difference detection apparatus and a distance detection unit for calculating distance data in response to a distance to the object based upon a phase difference detected by the phase difference detection apparatus. By such structure, it becomes possible to provide a range finding apparatus which realizes the above-described advantages.

In accordance with a sixth aspect of the invention, an imaging apparatus is provided with the above-described phase difference detection apparatus, an objective lens, an image formation unit on which an image of the object passed through the objective lens is formed, and a focusing control unit for carrying out a focusing operation between the objective lens and the image formation unit in response to the phase difference calculated by the phase difference detection apparatus. By such structure, it becomes possible to provide an imaging apparatus which realizes the above-described advantages.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
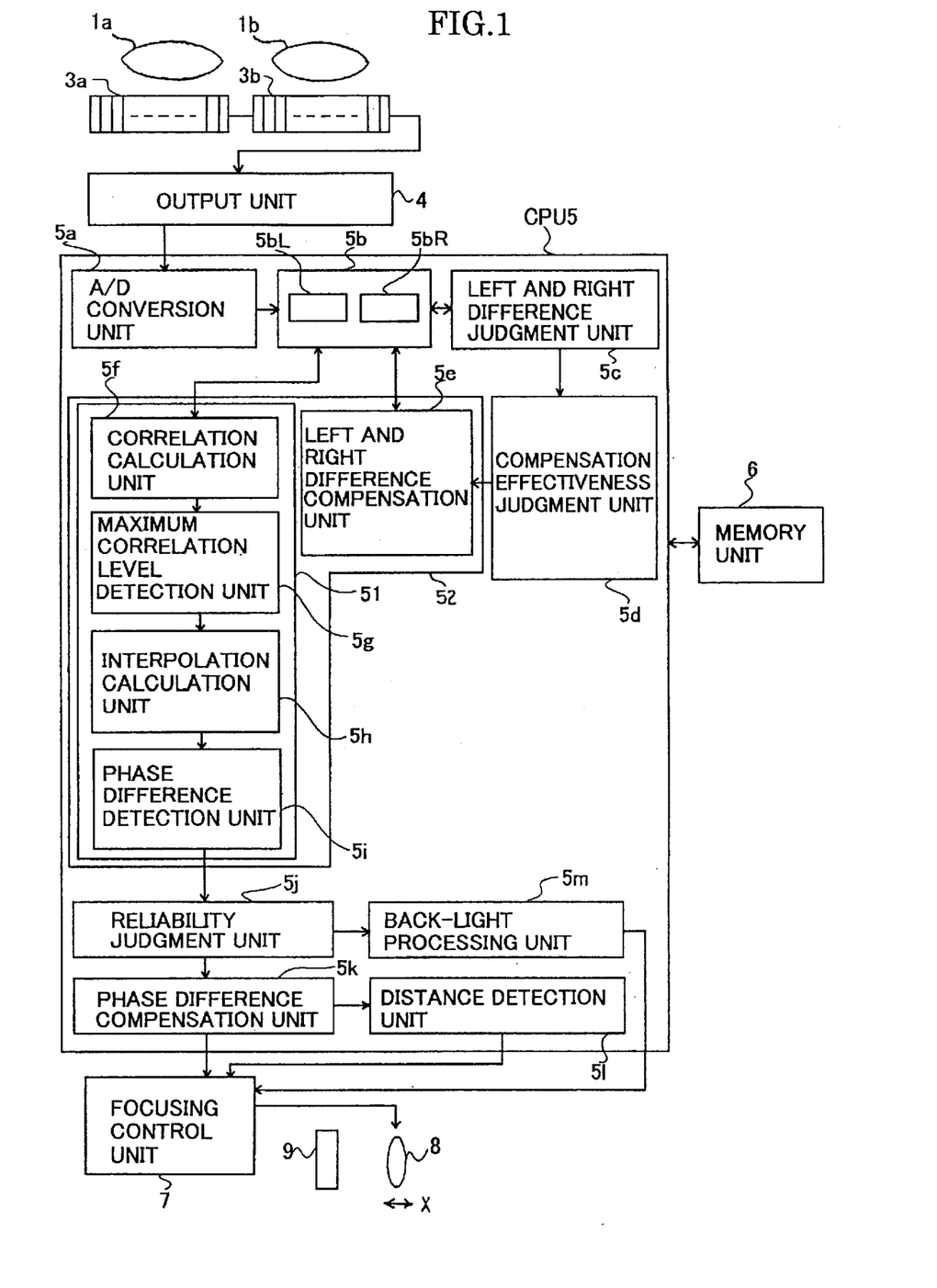
FIG. 1 is a block circuit diagram showing one example of the invention.

Hereinafter, a preferred embodiment of the invention will be described with reference to one embodiment shown in the drawings. FIG. 1 is an example in which the invention is embodied as an imaging apparatus. In FIG. 1, the same reference numerals are applied to the same structural components as in FIG. 7.

In FIG. 1, the pair of lenses 1a and 1b form images of the object 2, as described above, respectively on the pair of optical sensor arrays 3a and 3b. Each of the optical sensor arrays 3a and 3b is of a structure having 162 pixels (photoelectric conversion devices) located along a line, and each pixel outputs an electric signal which corresponds to the light intensity of the image of the object 2 which was formed on the pixel. As will be appreciated, it is possible to change the number of pixels in the pair of optical sensor arrays 3a and 3b as desired.

An output unit 4 provides the outputs of the pair of optical sensor arrays 3a and 3b to a CPU 5. The CPU 5 has first, second and third phase difference detection units, a first judgment unit, a second judgment unit and a distance detection unit for processing the outputs of the pair of optical sensor arrays 3a and 3b which are input thereto, as described below, based upon various programs and various data which are stored in a memory unit 6. A focusing control unit 7 is controlled by the CPU 5 and drives an objective lens 8 in opposite directions shown by arrow X to carry out a focusing operation between the objective lens 8 and an image formation unit 9. In addition, the image formation unit 9 may be a silver film and/or may be a solid-state imaging device having a photoelectric conversion device such as a so-called CCD sensor, a CMOS sensor, or the like.

Next, an operation of the device with particular emphasis on the function of the CPU 5 will be described with reference to FIGS. 1 and 2. In order to best explain the relevant functions of the CPU 5, a functional block diagram of the CPU 5 is shown in FIG. 1.

When a release switch (not shown) of the imaging device is operated, the pair of optical sensor arrays 3a and 3b start operation (step 3a). As described above, images of the object 2 are formed on the pair of optical sensor arrays 3a and 3b by the pair of lenses 1a and 1b through optical paths A and B which are different from each other, and an electric signal which corresponds to light intensity of the image is output from the pair of optical sensor arrays 3a and 3b.

An A/D conversion unit 5a converts the outputs of the pair of optical sensor arrays 3a and 3b which are input through the output part 4 from analog to digital. A memory unit 5b stores the outputs of the pair of optical sensor arrays 3a and 3b which were A/D converted into a pair of memory areas 5bL and 5bR as a pair of image data rows (IL, IR). In the presently described embodiment, the output of the optical sensor array 3a which was A/D converted is stored in the memory area 5bL and, in a similar manner, the output of the optical sensor array 3b which was A/D converted is stored in the memory area 5bR. Also, in the presently described embodiment, since the number of pixels of the pair of optical sensor arrays 3a and 3b is 162, respectively, the image data rows (IL, IR) are configured respectively by 162 data locations (IL(1–162), IR(1–162)).

A left and right difference judgment unit 5c reads out image data rows (in this embodiment, IL(1–162), IR(1–162)) in effective areas respectively from the pair of image data rows (IL, IR) stored in the memory 5b (step 3b), calculates an absolute value of a difference in their average values LA and RA (hereinafter, referred to as "left and right difference"), and judges whether or not the calculated left and right difference is more than a set value 1 (steps 3c, 3d and 3e).

More specifically, if the left and right difference is more than the set value 1, it is judged that there is an effect due to back-light and/or stray light on the image formed on the pair of optical sensor arrays 3a and 3b. If the left and right difference is less than the set value 1, it is judged that there is no effect of back-light or stray light on the image formed on the pair of optical sensor arrays 3a and 3b. In addition, the effective area is not limited to the above-described one but may be changed as desired. It should be noted that it is preferable for the set value 1 to be set to a value which is close to 0, while taking into consideration an error of an optical system and a conversion error of the optical sensor array.

In the event that the left and right difference judgment unit 5c judges that the absolute value of the difference in the average values of the pair of image data rows (IL, IR) is more than the set value 1, i.e., when there is an effect due to back-light and/or stray light on the image formed on the pair of optical sensor arrays 3a and 3b, a compensation effectiveness judgment unit 5d calculates a difference between (hereinafter, referred to "Max") a maximum value of IL(1–162) in the effective area (hereinafter, referred to as "ILmax") and a maximum value of IR(1–162) (hereinafter, referred to as "IRmax") in the effective area and a difference (hereinafter, referred to "Min") between a minimum value of IL(1–162) (hereinafter, referred to as "ILmin") and a minimum value of IR(1–162) (hereinafter, referred to as "IRmin") (steps 3f and 3g), and judges whether or not an absolute value of a difference of Max and Min is smaller than a set value 2 (step 3h).

In particular, when the absolute value of the difference of Max and Min is smaller than the set value 2, it is judged that a compensation which will be described later would be effective. On the other hand, when the absolute value of the difference of Max and Min is not smaller than the set value 2, it is judged that the compensation which will be described later would not be effective. In other words, the judgment is made as to whether or not the image data IL(1–162) and the image data IR(1–162) are in a parallel shift relation to one another or, more specifically, whether or not there is a possibility that the image data IL(1–162) and the image data IR(1–162) are in a parallel shift relation. In addition, it is desirable for the set value 2 to be set to 0 or a value which is close to 0.

When the compensation effectiveness judgment unit 5d judges that the compensation would be effective, i.e., when it judges that there is a possibility that the image data IL(1–162) and the image data IR(1–162) are in a parallel shift relation, a left and right difference compensation unit 5e serving as a compensation unit calculates a value by obtaining the sum of Max and Min and dividing it by 2, i.e., a value based upon a difference of respective maximum image data of the pair of image data rows and a difference of respective minimum image data of the pair of image data rows as a compensation amount (step 3i), and compensates a difference of IL and IR in the memory 5b by use of the calculated compensation amount (step 3j).

As a method of performing compensation in step 3j, for example, LA and RA are compared. If LA is smaller than RA, the above-described compensation amount is added to individual image data IL(1–162) of IL and subtracted from individual image data IR(1–162) of IR. If LA is larger than RA, the compensation amount is subtracted from individual image data IL(1–162) of IL and added to individual image data IR(1–162) of IR. In other words, compensation is carried out for parallel-shifting the image data IL(1–162) or the image data IR(1–162) based upon a detected shift amount. Alternatively, compensation for parallel-shifting both of the image data IL(1–162) and the image data IR(1–162) may be carried out. In such case, the total shift amount is set to become the compensation amount.

As described above, a judgment is made as to whether or not the compensation would work effectively. In the case that there is a possibility that the compensation would work effectively, the compensation is carried out. Thus, the possibility that non-productive compensation is carried out is reduced. In the presently described embodiment, if there is a possibility that the image data IL(1–162) and the image data IR(1–162) are in a parallel shift relation, compensation is carried out by parallel-shifting the image data IL(1–162) or the image data IR(1–162), or both of the image data IL(1–162) and the image data IR(1–162), so that it is possible to reduce the probability that the non-productive compensation is carried out.

Also, since the value which was used for judging whether or not the compensation would be effective is also used for calculating the compensation value, dual uses of the same data is achieved.

Also, since the difference in the pair of image data rows is compensated for based upon the difference in maximum image data values in each of the pair of image data rows and the difference in minimum image data values in each of the pair of image data rows, or, in more detail, based upon an average value of the difference therebetween, in the event it is necessary to perform compensation for reducing degradation of the detection accuracy due to the presence of a strong light source such as the sun or the like in the background or the like of the object, in the presently described embodiment, in case that the left and right difference judgment unit 5c judged that there is an effect of back light and/or stray light on the images formed on the pair of optical sensor arrays 3a and 3b, it is possible to effectively avoid complicated calculations when calculating the difference in average values of respective image signals which was carried out in the related art in order to calculate the compensation value, and it is possible to simplify the compensation processing.

Also, in case that there is no effect due to back-light, since the judgment of whether or not the compensation is effective is not carried out, this judgment may be eliminated when there is no necessity of judging whether or not the compensation is effective.

If compensation is carried out at the step 3j, or if the left and right difference is less than the set value 1 at the step 3e and it is judged that there is no effect due to back-light or stray light on the images formed on the pair of optical sensor arrays 3a and 3b, or if it is judged that the compensation would not be effective at the step 3h, correlation calculation is carried out by a correlation calculation unit 5f (step 3k). Correlation calculation may be performed by extracting partial image data groups (iL, iR) from the pair of image data rows (IL, IR) stored in the memory 5b so that their relative positions differ on the optical sensor arrays, and calculating a correlation level based on a combination of the extracted respective partial image data groups (iL, iR). In the presently described embodiment, correlation calculation is performed as follows. The number of data values in the partial image data groups is set at 26, and as shown in FIG. 7B, the partial image data group (iL) which is extracted from the image data row (IL) is fixed and the partial image data group (iR) which is extracted from the image data row (IR) is dislocated one by one. More precisely, correlation calculation is carried out based upon the following equation (1).

$$S(I) = \Sigma 25\ i=0\ \Im IL65+i-IR1+i\Im \quad (1)$$

wherein $I=1-137, L(1-162), R(1-162)$

When the correlation calculation of step 3k is completed, a maximum correlation level detection unit 5g detects, based upon calculation result of equation (1) carried out by the correlation calculation unit 5f, a local minimal value S(I) (hereinafter, referred to as S(x) shown in FIG. 7B), i.e., a maximum correlation level (step 3l).

When the local minimal value S(x) is detected, an interpolation calculation unit 5h compensates x and the local minimal value S(x) by use of an interpolation method which uses the local minimal value S(x) and correlation calculation function values S(x−1) and S(x+1) that come directly before and after it (step 3m). Since this interpolation calculation is a well-known technique, a detailed explanation will be omitted. When x is compensated by the interpolation calculation, a phase difference detection unit 5i detects a shift amount from a reference position (which is, for example, in the case of outside light triangular ranging like that performed in a non-TTL camera, set to be a position which corresponds to a center position of the image of the object at an infinity in a measurement direction, and in the case of a focus detection apparatus used in a TTL camera, set to be a position which corresponds to a center position of the image of the object when a taking lens is in a focused state) of the compensated x value at the side of the optical sensor 3b, i.e., the phase difference (step 3n). In addition, first and third phase difference detection unit 51 functionally has the correlation calculation unit 5f, the maximum correlation level detection unit 5g, the interpolation calculation unit 5h and the phase difference detection unit 5i. A second phase difference detection unit 52 has the left and right difference compensation unit 5e, the correlation calculation unit 5f, the maximum correlation level detection unit 5g, the interpolation calculation unit 5h and the phase difference detection unit 5i.

When the phase difference is detected, a reliability judgment unit 5j judges whether or not the compensated local minimal value S(x) is larger than a set value 3, i.e., whether or not reliability of the local minimal value S(x) is high (step 3o). More precisely, in case that the local minimal value S(x) is less than a set value 3, it is judged that the reliability is high, and in case that the local minimal value S(x) is larger than the set value 3, it is judged that the reliability is low.

When it is judged that the reliability is high at step 3o, a phase difference compensation unit 5k carries out a predetermined compensation, etc., to the phase difference calculated at the step 3*n* (step 3*p*). As this compensation, for example, temperature compensation may be performed. In addition, this compensation may be carried out or may be eliminated in accordance with a required phase difference detection accuracy.

The focusing control unit 7 controls a position of the objective lens 8 based upon the compensated phase difference, and a focusing operation between the objective lens 8 and the image formation unit 9 is carried out. In addition, in case of a non-TTL camera, the foregoing is not limited and distance data to the object 2 may calculated by a distance detection unit 5*l* based upon the compensated phase difference and, based upon this distance data, the focusing control unit 7 controls the position of the objective lens 8 and the focusing operation between the objective lens 8 and the image formation unit 9 may be carried out.

When it is judged that the reliability is low at the step 3*o*, a back-light processing unit 5*m* carries out a predetermined back-light processing, for example, a release lock and a fixed distance output (step 3*q*).

Figure 3A:
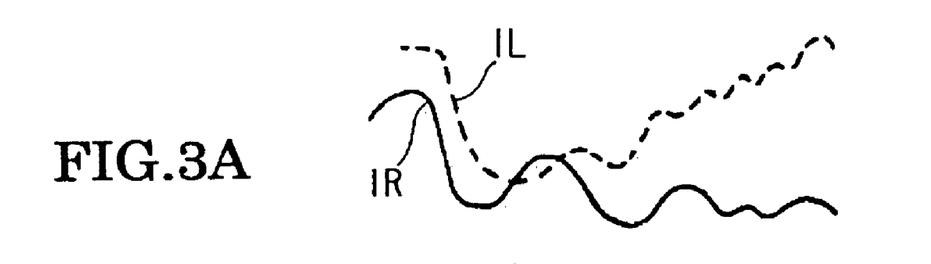
FIGS. 3A to 3D are explanatory views showing a pair of image data rows (IL, IR)
Figure 3B:
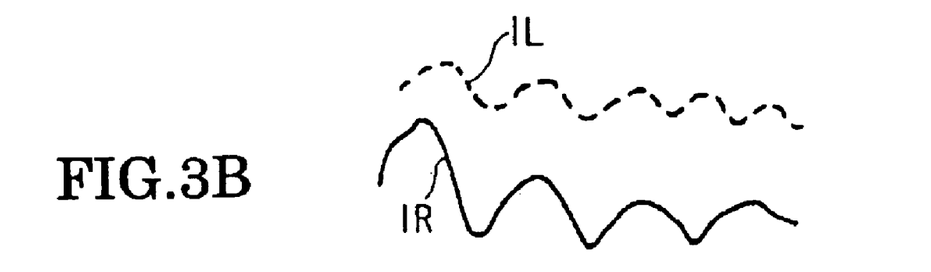
Figure 3C:
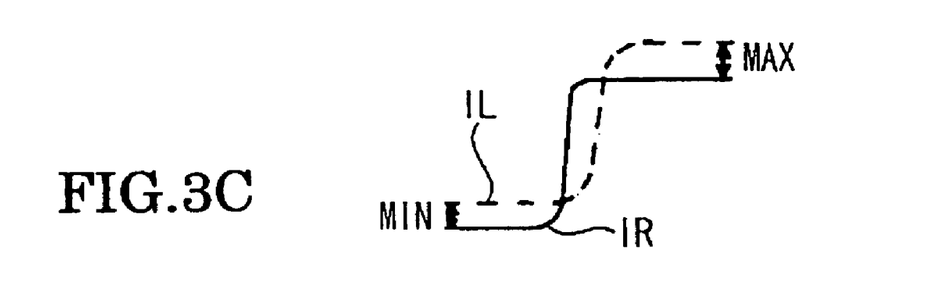
Figure 3D:
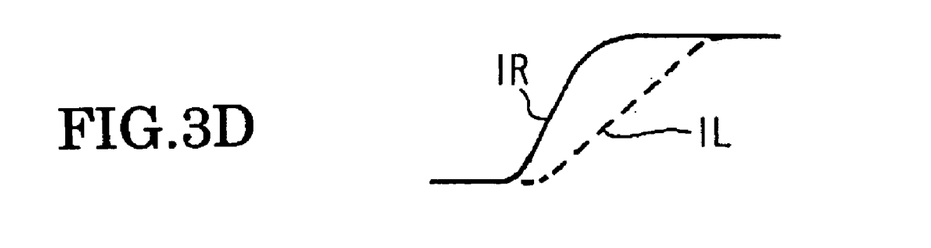

By carrying out such compensation, when the image signal is as shown in FIGS. 3A and 3B, non-productive compensation is prevented from being carried out and, as shown in FIG. 3C, when the pair of image data are in a parallel shift relation, effective compensation is carried out. Also, even when the pair of image data are as shown in FIG. 3D, it becomes possible to carry out back-light processing by the reliability judgment at step 3*o*.

In the foregoing description, an example of correlation calculation is described in which one of the partial image data groups (iL) is fixed and the other partial image data group (iR) is dislocated one-by-one. Alternatively, it is possible to change the method of the correlation calculation as desired. For example, as disclosed in JP-A-8-166237, both of the partial image data groups may be dislocated sequentially so that their relative positions differ.

In the foregoing description, the set value 2 which is used for judgment at the compensation effectiveness judgment unit 5*d* is set to be a fixed value. However, this set value 2 may be made variable. In this case, if the set value is changed according to various situations, it becomes possible to improve the accuracy of the compensation effectiveness judgment. For example, the set value 2 is made to be changed based upon the difference of the pair of image data rows. As one concrete example, such a value that an absolute value of LA–RA is divided by the set value 2 which is the above-described fixed value and then multiplied by a constant number, and such a value that the absolute value of LA–RA is multiplied by a predetermined constant number are set to be the set value 2. In this case, since, as the difference of the pair of image data rows is enlarged, the set value 2 is also enlarged, it becomes possible to reduce the effect of noise and the like, which are likely increased as the difference of the pair of image data rows is enlarged at the time of the judgment of compensation effectiveness, and also, it becomes possible to use LA and RA which were used for the back-light judgment as a parameter of the set value 2. Thus, it is possible to achieve dual uses of the same data.

Figure 4A:
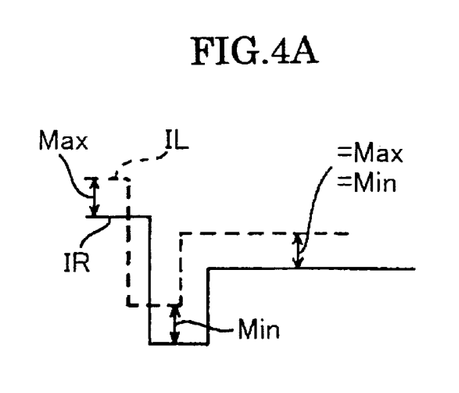
FIGS. 4A to 4D are explanatory views showing a pair of image data rows (IL, IR)
Figure 4B:
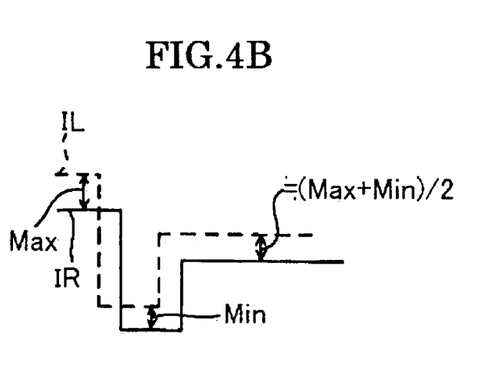
Figure 4C:
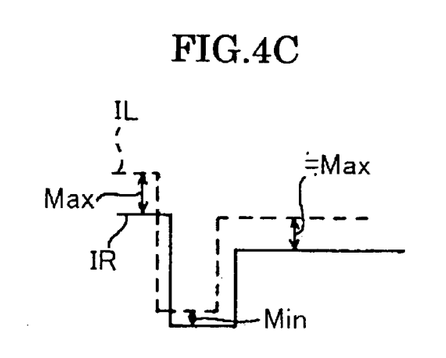
Figure 4D:
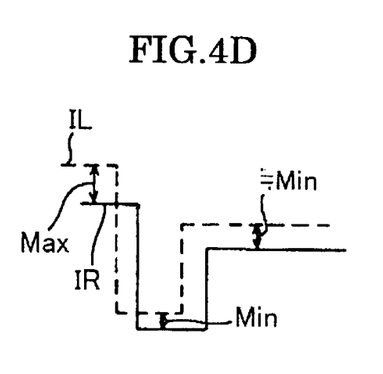
Figure 5A:
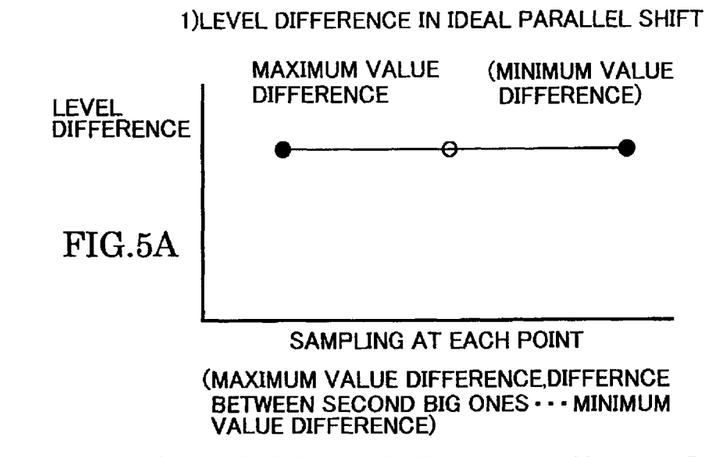
FIGS. 5A to 5D are explanatory views showing a level difference of the image data rows of FIG. 4.
Figure 5B:
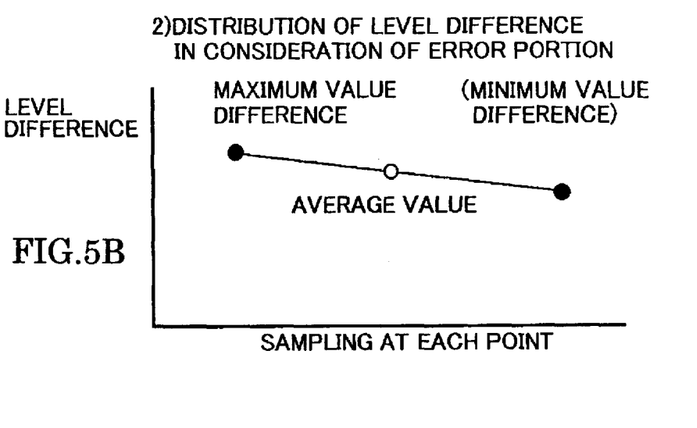
Figures 5C, 5D:
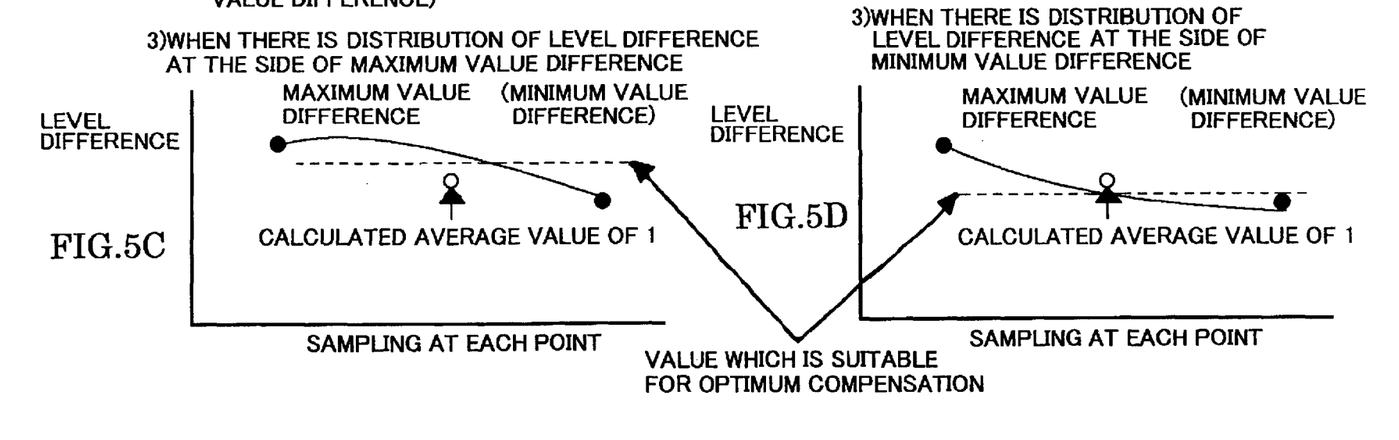

Also, in the foregoing description, when calculating the compensation value at the left and right difference compensation unit 5*e*, (Max+Min)/2 is set to be the compensation value. When performing this compensation, compensation accuracy is improved when an overall level difference of the pair of image data is close to (Max+Min)/2, for example, as shown in FIGS. 4A and 4B. However, in the case of a distribution in which the level difference of major part of the pair of image data is close to the maximum value data difference (Max) as shown in FIG. 4C and in the case of a distribution in which it is close to the minimum value data difference (Min) as shown in FIG. 4D, the compensation amount is either not enough or is too much and there occurs a problem that the compensation accuracy becomes low. FIGS. 5A to 5D shows the data difference, i.e., "level difference" in FIGS. 4A to 4D. The horizontal axis shows respective image data rows (IL(1–162) and IR(1–162)) aligned in descending order of data value, respectively, and the vertical axis shows their level differences.

Figure 6:
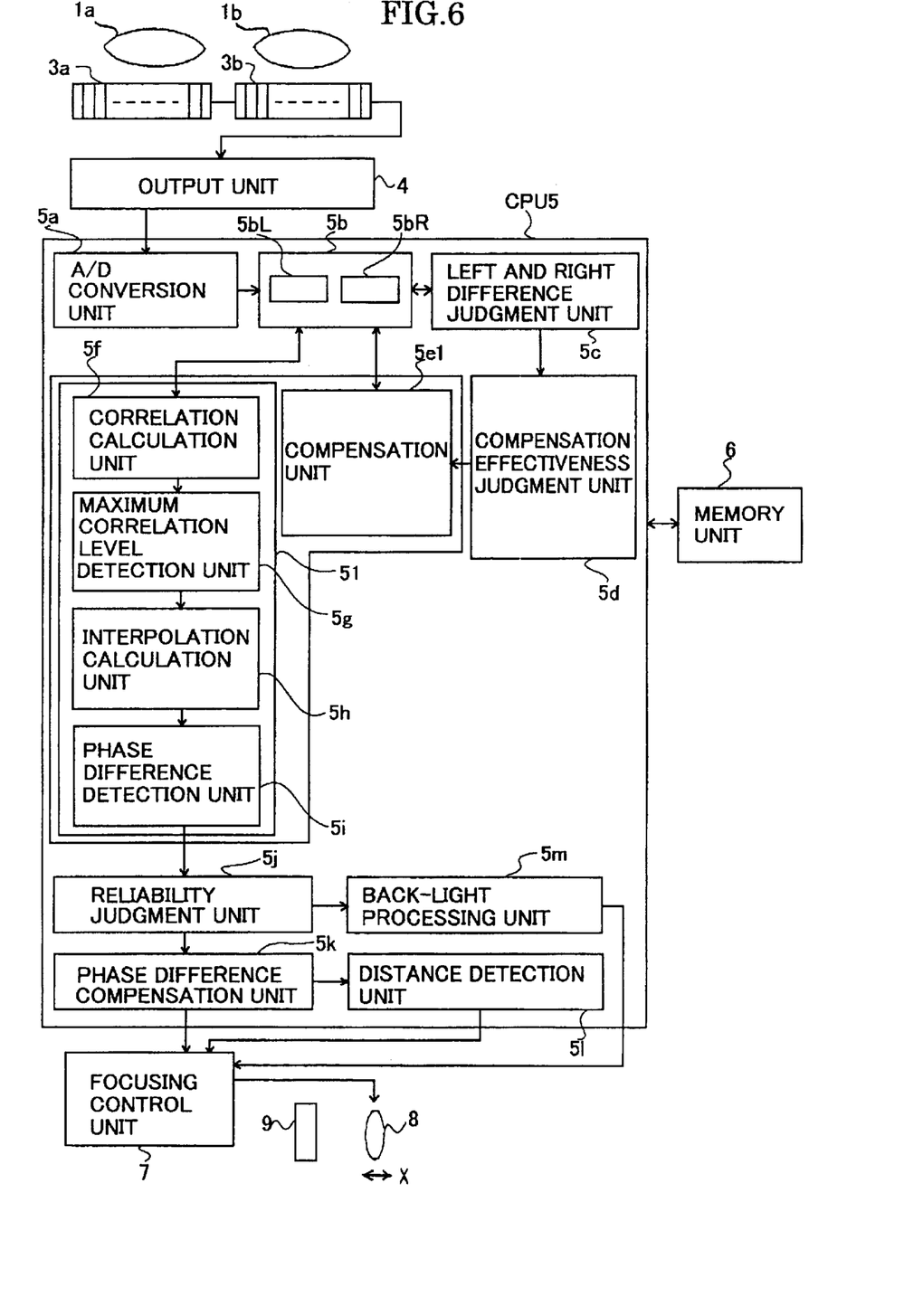
FIG. 6 is a block diagram showing another embodiment of the invention.

In the foregoing case, that is, as a response to the cases shown in FIGS. 4C and 4D, as shown in FIG. 6, instead of the left and right difference compensation unit 5*e* in FIG. 1, a compensation unit 5*e*1 for compensating for a difference in the pair of image data rows comprised of a plurality of image data values which are generated in response to the outputs of the pair of optical sensor arrays on which the image of the object is formed based upon the average values of the difference in maximum image data values in each of the pair of image data rows and the difference in minimum image data values in each of the pair of image data rows and the difference of the average values of respective image data rows may be used. As one example of the compensation in this case, in case of |LA−RA|=Asub and |Max+Min|/2=Revi, the compensation value is set as: compensation value=(Asub+Revi)/2 and the data difference between the pair of image data rows is compensated for by this compensation value. In FIG. 6, like reference numerals and signs are used to designate like structural and functional elements as in FIG. 1.

Figure 2:
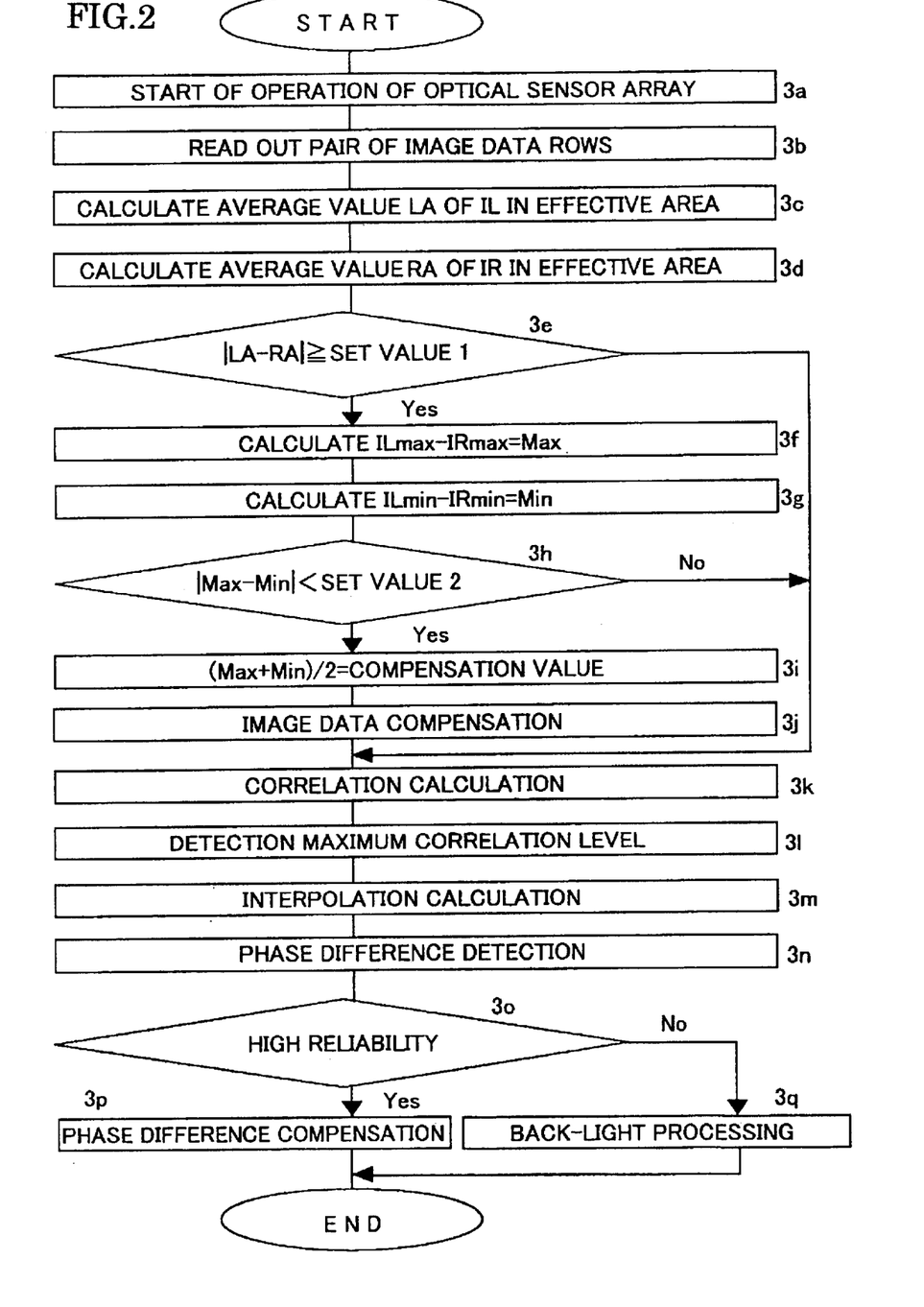
FIG. 2 is a flowchart used for an operational explanation of FIG. 1.

The operations of FIG. 6 differ from those of FIG. 2 to the extent that rather than performing step 3*i* of FIG. 2, an operation for calculating the above-described compensation value=(Asub+Revi)/2 is carried out. Thereafter, at step 3*j*, by use of the compensation value calculated by (Asub+Revi)/2, an operation for compensating the data difference of the pair of image data rows is carried out. Other operations of the FIG. 6 embodiment are the same as those of the FIG. 2 embodiment.

In this case, since the compensation value is calculated based upon the average value of respective image signals as well as the average value of the difference in maximum image data values in each of the pair of image data rows and the difference in minimum image data values in each of the pair of image data rows, it becomes possible to compensate the compensation value in the invention of FIG. 1 based upon the difference in the average values of respective image signals, and it becomes possible to carry out compensation with a high degree of accuracy. Stated otherwise, since the compensation value is not calculated based upon solely upon the difference in the average values of respective image signals, it becomes possible to reduce the effect on the compensation value of an image signal which exists in only one of the pair of image signals.

Also, as the compensation unit 5*e*1, for example, a value obtained by multiplying (Max+Min)/2 by an absolute value of LA–RA and then by a predetermined constant number is calculated to obtain a compensation value. By this compensation value, the difference between the pair of image data rows may be compensated. Also in this case, it becomes possible to reflect the difference in the pair of image data rows (difference in the average values) to the compensation value, and the same advantages as described above can still be obtained.

Also, in the above-described respective examples, the left and right difference compensation unit 5*e* and the compensation unit 5e1 are configured so that they compensate the difference of the pair of image data rows only in case that the compensation effectiveness judgment unit 5d judges that the compensation is effective. However, without use of the judgment result of the compensation effectiveness judgment unit 5d, by the above-described compensation value, the difference of the pair of image data rows may be compensated. In this case, since it becomes possible to omit the compensation effectiveness judgment unit 5d, it is possible to simplify the structure and function.

In the foregoing description, the number of data values of respective image data rows (IL, IR) is set at 162 and the number of data values of the partial image data group is set at 26. However, it is possible to change these numbers as desired.

Also, in the foregoing description, an example in which the invention is embodied as an imaging apparatus is shown. However, the invention is not limited to an imaging apparatus. For example, it is possible to use the invention in various range finding apparatuses, focal point detection apparatuses, and the like.

According to the present invention, since the difference in the pair of image data rows is compensated for based upon the difference in maximum image data values in each of the pair of image data rows and the difference in minimum data values in each of the pair of image data rows, it becomes possible to effectively avoid the complicated calculations used in the related art for calculating the difference in average values of respective image signals which was carried out in the past in order to calculate the compensation value for reducing the degradation of detection accuracy due to the presence of a strong light source such as the sun or the like in the background or the like of an object, and it becomes possible to simplify compensation processing.

What is claimed is:

1. A phase difference detection method comprising:
a compensation step of compensating for difference between a pair of image data rows which are each comprised of a plurality of image data values generated in response to outputs of a pair of optical sensor arrays on which images of an object are formed, based upon a difference in maximum image data values in each of the pair of image data rows and a difference in minimum image data values in each of the pair of image data rows; and
a detection step of detecting a phase difference between the images formed on the pair of optical sensor arrays based upon the pair of image data rows.

2. A phase difference detection method according to claim 1; wherein the compensation step comprises the step of compensating for the difference between the pair of image data rows based upon the difference in the maximum image data values and the difference in the minimum image data values and an average value of the image data values in each of the image data rows.

3. A phase difference detection method according to claim 1; further comprising a judgment step of judging whether or not compensation would be effective for compensating for the difference between the pair of image data rows; and wherein the detection step comprises a first detection step of detecting a phase difference between the images formed on the pair of optical sensor arrays based upon the pair of image data rows when it is judged that the compensation would not be effective, and a second detection step of performing the compensation step on the pair of image data rows when it is judged that the compensation would be effective and detecting a phase difference between the images formed on the pair of sensor arrays based upon the image data row after performing the compensation step.

4. A phase difference detection method according to claim 3; wherein the judgment step comprises the step of judging that the compensation would be effective when an output waveform of one of the pair of optical sensor arrays is shifted in parallel with respect to an output waveform of the other optical sensor array; and the compensation step is performed based upon an amount of the shift.

5. A phase difference detection method according to claim 3; wherein the second detection step comprises the step of compensating for the difference between the pair of image data rows by a compensation value determined based upon the difference in the maximum image data values and the difference in the minimum image data values.

6. A phase difference detection apparatus comprising:
a pair of optical sensor arrays on which images of an object are formed;
a compensation unit for compensating for difference between a pair of image data rows which are each comprised of a plurality of image data values generated in response to outputs of the pair of optical sensor arrays, based upon a difference in maximum image data values in each of the pair of image data rows and a difference in minimum image data values in each of the pair of image data rows; and
a phase difference detection unit for detecting a phase difference between the images formed on the pair of optical sensor arrays based upon the pair of image data rows.

7. A phase difference detection apparatus according to claim 6; wherein the compensation unit compensates for the difference between the pair of image data rows based upon the difference in the maximum image data values and the difference in the minimum image data values and an average of the image data values in each of the image data rows.

8. A phase difference detection apparatus according to claim 6; further comprising a judgment unit for judging whether or not compensation would be effective for compensating for the difference between the pair of image data rows; and wherein the phase difference detection unit comprises a first phase difference detection unit for detecting a phase difference between the images formed on the pair of sensor arrays based upon the image data row when it is judged by the judgment unit that the predetermined compensation would not be effective, and a second phase difference detection unit for detecting a phase difference between the images formed on the pair of sensor arrays after the compensation unit performs the compensation when it has been determined that the compensation would be effective.

9. A range finding apparatus comprising: a phase difference detection apparatus according to claim 8; and a distance detection unit for calculating a distance to the object based upon a phase difference detected by the phase difference detection apparatus.

10. An imaging apparatus comprising: a phase difference detection apparatus according to claim 8; an objective lens; an image formation unit on which an image of the object is formed after passing through the objective lens; and a focusing control unit for carrying out a focusing operation between the objective lens and the image formation unit in response to the phase difference calculated by the phase difference detection apparatus.

11. A phase difference detection apparatus according to claim 8; wherein the judgment unit judges that compensation would be effective when an output waveform of one of the pair of optical sensor arrays is shifted in parallel with respect to an output waveform of the other optical sensor array; and the compensation unit performs compensation based upon an amount of the shift.

12. A phase difference detection apparatus according to claim 8; further comprising a second judgment unit for judging whether or not the images formed on the pair of sensor arrays based on the image data row are affected by back-light; and a third phase difference detection unit for detecting a phase difference between the images formed on the pair of sensor arrays based upon the pair of image data rows when the second judgment unit judges that the images are not affected by back-light; wherein the judgment unit carries out the judgment only when the second judgment unit judges that the images formed on the pair of sensor arrays are affected by back-light.

13. A range finding apparatus comprising: a phase difference detection apparatus according to claim 6; and a distance detection unit for calculating a distance to the object based upon a phase difference detected by the phase difference detection apparatus.

14. An imaging apparatus comprising: a phase difference detection apparatus according to claim 6; an objective lens; an image formation unit on which an image of the object is formed after passing through the objective lens; and a focusing control unit for carrying out a focusing operation between the objective lens and the image formation unit in response to the phase difference calculated by the phase difference detection apparatus.

* * * * *